UNITED STATES PATENT OFFICE.

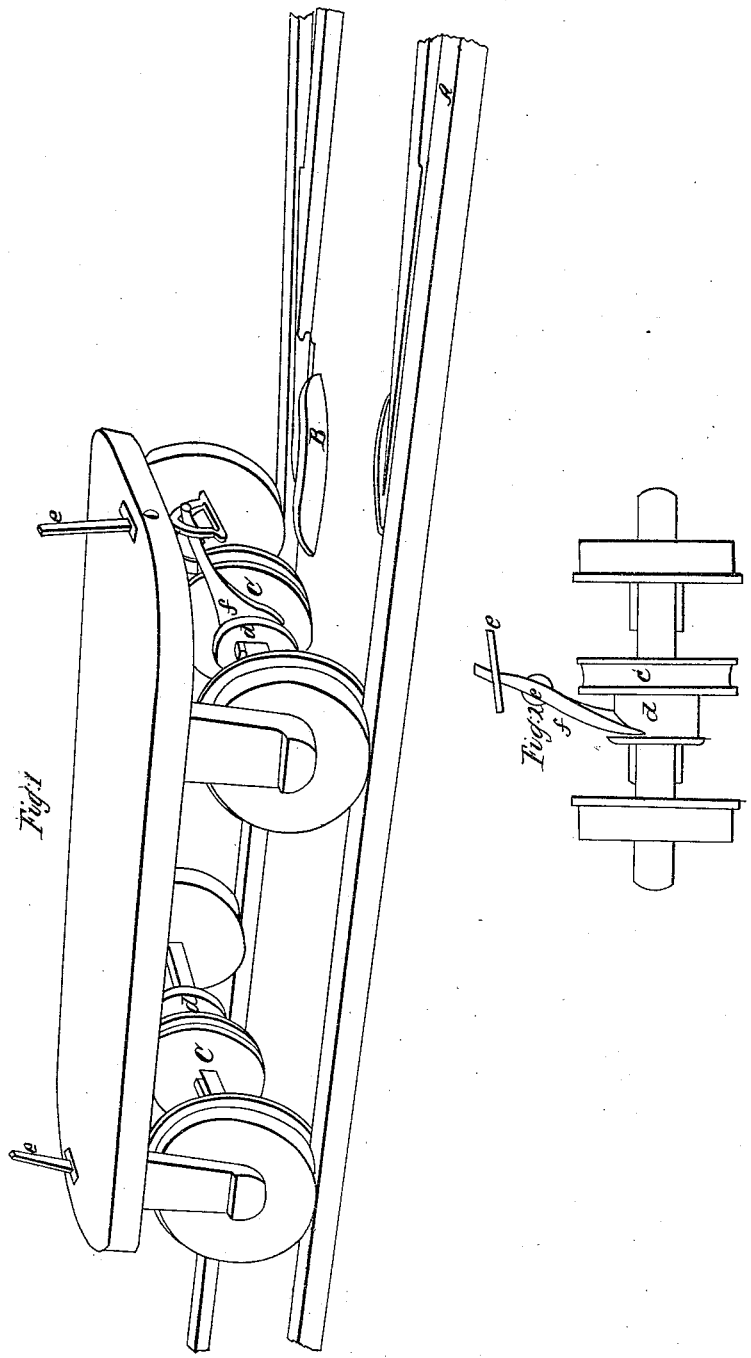

JOHN A. HEYL, OF BOSTON, MASSACHUSETTS.

IMPROVEMENT IN RAILROAD-SWITCHES FOR STREET-CARS.

Specification forming part of Letters Patent No. 53,822, dated April 10, 1866.

*To all whom it may concern:*

Be it known that I, JOHN A. HEYL, of the city of Boston, in the county of Suffolk and State of Massachusetts, have invented a new and useful Improvement in Self-Acting Switches for Horse-Railroads, which I now proceed to describe.

Figure 1 represents a perspective view of the whole. Fig. 2 represents a detached sectional view of the grooved wheel and levers.

The same parts are indicated by the same letters in both drawings.

A A are two frogs or stationary points in the place of a movable switch. (Patent of October 8, 1861, No. 2,430, called "self-acting horse-railroad switches.") Between said two frogs lies the curved iron B, which is raised a little above the ordinary track or rails, and is rounding on the upper surface.

C is a wheel a little smaller than the car-wheels, with a double flange or a groove on its periphery, so as to fit on the curved iron B. Said wheel C is attached to the car-axles between the wheels, and slides from left to right, and vice versa, in a given space, which movement is performed through the agency of the levers $f$ and $e$ and the flange-wheel $d$, attached to the above-mentioned wheel C. Between said flange-wheel $d$ and the grooved wheel C is left a space, in which works one end of the lever $f$, which is fastened horizontally to the bottom of the car, and is operated by the forked lower extremity of lever $e$, which projects vertically through the platform, and is also fastened by a pivot, and can easily be managed by the driver.

The foregoing operates as follows: If it is required to turn or switch the car off its straight course the driver moves the lever $e$, the lower end of which, being connected with the lever $f$, operates on the same, which said lever $f$, working with its forked end between the flange-wheels C and $d$, will slide the grooved wheel C in position to run onto the curved iron B, thereby guiding the car to the other track. If the car is desired to pass on its straight course the driver moves the levers $e$ and $f$, and thereby the wheel C, into a central position, thereby passing and avoiding the curved iron B.

The aforesaid wheels C and $d$ and the levers $e$ and $f$ are attached to both ends of the car, but only the forward one is to be operated.

I claim—

The arrangement of the double-flanged wheel C and attached wheel $d$, operated by levers $e$ and $f$, upon and in combination with the axles of a car, as described, and operated with the said double-flanged wheel astride of the guide-rail, substantially as described.

JOHN A. HEYL.

In presence of—
W. P. WALLEY,
G. C. TOBEY.